US011951708B2

(12) United States Patent
Zhou et al.

(10) Patent No.: US 11,951,708 B2
(45) Date of Patent: Apr. 9, 2024

(54) CREPING BLADE AND METHOD FOR MANUFACTURING SAME

(71) Applicant: Ganzhou En Chuang Technology Company Limited, Ganzhou (CN)

(72) Inventors: Jing Zhou, Ganzhou (CN); Zichao Zhou, Ganzhou (CN)

(73) Assignee: Ganzhou En Chuang Technology Company Limited, Ganzhou (CN)

( * ) Notice: Subject to any disclaimer, the term of this patent is extended or adjusted under 35 U.S.C. 154(b) by 709 days.

(21) Appl. No.: 17/031,835

(22) Filed: Sep. 24, 2020

(65) Prior Publication Data

US 2021/0053311 A1 Feb. 25, 2021

Related U.S. Application Data

(63) Continuation of application No. PCT/CN2018/090759, filed on Jun. 12, 2018.

(30) Foreign Application Priority Data

Mar. 26, 2018 (CN) ......................... 201810252578.4

(51) Int. Cl.
*B31F 1/14* (2006.01)

(52) U.S. Cl.
CPC .................................... *B31F 1/145* (2013.01)

(58) Field of Classification Search
CPC ......... D21G 3/04; B31F 1/145; B31D 3/0207; B31D 3/0284; C23C 4/02; C23C 4/10;
(Continued)

(56) References Cited

U.S. PATENT DOCUMENTS 4,904,542 A * 2/1990 Mroczkowski ......... C23C 30/00 428/629
5,753,076 A 5/1998 Costello et al.
(Continued)

FOREIGN PATENT DOCUMENTS

CN 1834343 A 9/2006
CN 1847521 A 10/2006
(Continued)

OTHER PUBLICATIONS

Machine Translation of CN 1847521 A. (Year: 2006).*
(Continued)

*Primary Examiner* — Jose A Fortuna
(74) *Attorney, Agent, or Firm* — Westbridge IP LLC

(57) ABSTRACT

A creping blade and a preparation method thereof are provided. The creping blade comprises a base, wherein a wear-resistant coating is provided on the top of the base, and a protective layer is arranged below the wear-resistant coating at the contact point between the creping blade and a dryer, and the hardness of the protective layer is lower than that of the surface of the dryer of a paper machine. The creping blade of the invention is advantageous in that the friction portion of working surface has an unlimited area and has a high wear-resistant coating, and the paper impact portion has high wear resistance and high impact resistance, so that the creping blade has a long service life, which can be several times or even tens of times that of the common steel creping blade.

20 Claims, 8 Drawing Sheets

(58) Field of Classification Search
CPC ......... C23C 4/129; C23C 4/18; C23C 28/322; C23C 28/341; C23C 28/347
See application file for complete search history.

(56) References Cited

U.S. PATENT DOCUMENTS

| | | | | |
|---|---|---|---|---|
| 6,207,021 | B1 | 3/2001 | Eriksson et al. | |
| 2002/0189777 | A1 | 12/2002 | Rata et al. | |
| 2005/0051292 | A1 | 3/2005 | Laithier et al. | |
| 2006/0078687 | A1 * | 4/2006 | Korpiola | D21G 3/005 427/446 |
| 2006/0150897 | A1 * | 7/2006 | Vesterlund | D21G 3/005 118/100 |
| 2014/0234651 | A1 * | 8/2014 | Molz | C23C 28/00 428/626 |
| 2022/0396048 | A1 * | 12/2022 | Kossmann | B31F 1/145 |

FOREIGN PATENT DOCUMENTS

| | | | | | |
|---|---|---|---|---|---|
| CN | 201979788 | U | | 9/2011 | |
| CN | 205077322 | U | | 3/2016 | |
| CN | 106182906 | A | | 12/2016 | |
| CN | 106609348 | A | | 5/2017 | |
| CN | 107250419 | A | | 10/2017 | |
| DE | 102011115813 | A1 | | 4/2013 | |
| EP | 1573125 | B1 | * | 9/2007 | C23C 4/02 |
| EP | 1573126 | B1 | * | 9/2007 | C23C 4/02 |
| EP | 3779037 | A4 | * | 7/2021 | B31D 3/0207 |
| GB | 2128551 | A | | 5/1984 | |
| GB | 2295400 | A | * | 5/1996 | C23C 4/02 |
| WO | WO-0013860 | A1 | * | 3/2000 | B26D 1/0006 |
| WO | 2005023533 | A1 | | 3/2005 | |
| WO | 2006134208 | A1 | | 12/2006 | |
| WO | 2006134209 | A1 | | 12/2006 | |
| WO | WO-2006134208 | A1 | * | 12/2006 | B31F 1/145 |
| WO | WO-2006134209 | A1 | * | 12/2006 | C23C 4/02 |
| WO | 2008037850 | A1 | | 4/2008 | |
| WO | 2012128700 | A1 | | 9/2012 | |
| WO | WO-2014090909 | A1 | * | 6/2014 | C23C 28/00 |

OTHER PUBLICATIONS

Machine Translation of CN 106182906 A. (Year: 2016).*
International Search Report in corresponding PCT Application No. PCT/CN2018/090759, dated Sep. 29, 2018.
First Office Action issued in counterpart Chinese Patent Application No. 201810252578.4, dated Jan. 20, 2023.
First Search Report issued in counterpart Chinese Patent Application No. 201810252578.4, dated Jan. 20, 2023.
Extended European Search Report issued for counterpart European Patent Application No. 18911993.6, dated Jun. 4, 2021.
Second Office Action ssued in counterpart Chinese Patent Application No. 201810252578.4, dated Jun. 28, 2023.
Third Office Action issued in counterpart Chinese Patent Application No. 201810252578.4, dated Nov. 16, 2023.
Zhang, Building Materials, 2016, pp. 12-13, Tongji University Press, Shanghai, dated Feb. 29, 2016.

* cited by examiner

CREPING BLADE AND METHOD FOR MANUFACTURING SAME

TECHNICAL FIELD

The invention relates to a creping blade and a preparation method thereof, especially to a creping blade used for preparing household paper and a preparation method thereof.

BACKGROUND

The creping blade is an important part in the production process of household paper, and its role in the production process is to peel the paper from the surface of a dryer, while applying a necessary pressure to the contact paper surface to form a wrinkle structure on the paper surface.

In order to meet the requirements of creping process, the creping blade should have the following main properties: good wear resistance, suitable sharpness of the edge of the creping blade, and the profile geometry satisfying the performance requirements on paper strength, bulk etc., and the base of the creping blade having suitable rigidity and elasticity.

Creping blades which are widely used at present are basically divided into two classes: steel creping blade and coated creping blade.

Steel creping blade is the earliest used creping blade in the production of household paper, and it is still widely used at present. The schematic diagram of steel creping blade is shown in FIG. 1.

Steel creping blade is generally made of quenched steel, with good wear resistance and toughness. When working, the creping blade uses the intersection line with the top surface close to the dryer surface as a working edge. On one hand, it functions to peel off the paper pasted on the dryer surface, and on the other hand, the top of the creping blade near the edge functions to press and crepe the paper surface. The thickness of wrinkles can be adjusted in some extent by presetting the angle between the top and the side surface of the creping blade.

The steel creping blade has obvious deficiencies in the practical use, which are mainly shown in both short service life and unstable wrinkles, which will seriously affect the improvement of production efficiency and product quality.

The reason for the short service life of steel creping blade is that the wear resistance is not strong, and the failure process thereof can be explained by comparing FIG. 1 and FIG. 2. The paper quality is good when the steel creping blade begins to work. However, as time elapses, the working edge of the creping blade changes, and the working part of the creping blade which touch with the dryer is quickly worn into a ribbon pattern from a nearly linear pattern, and the edge becomes a round corner. The top of the creping blade will begin to appear impact lines along the length direction of the creping blade and non-uniform wear marks in the vertical direction due to paper impact and scratch, thus generating grooves. The above phenomenon will gradually accumulate over time, and the creping and physical properties of the paper will change accordingly. After working for a period, the edge is passivated. Then, the wrinkle structure of the prepared paper exceeds the requirements of the quality standard, and the creping blade fails to work and is discarded.

The steel creping blade has the above obvious defects. At present, the steel creping blade is gradually replaced by the creping blade which forms a local dense wear-resistant coating on the steel base by surface technology such as thermal spraying. The wear-resistant coating is usually ceramic material, or composite material containing carbide. This kind of creping blade is called ceramic creping blade.

The structure of the ceramic creping blade available in the market at present is roughly the same. As shown in FIG. 3, the shadow part is a ceramic coating, which only exists in the working surface, and there is no coating on the top surface of the creping blade. Significantly different from the steel blade, the contact part of the coating of the ceramic creping blade with the dryer has a small transition angle ground in advance during manufacture, and the top of the transition angle of ceramic coating, instead of the steel base, contacts with the dryer when working. Since the wear resistance of the coating is much higher than that of the steel, it can achieve the object of improving the wear resistance of the creping blade and prolonging the life of the creping blade.

However, the ceramic creping blade has still some defects: firstly, like the steel creping blade, the edge of the working surface in contact with the dryer will be passivated over time, resulting in the change of the wrinkle structure of the paper surface. When such change accumulates to some extent to exceed the quality standard, it causes the creping blade to fail. Although the failure process of this kind of ceramic creping blade will be much longer than that of the ordinary steel blade, the problem of causing the change of the paper wrinkle structure during use still exists, and the uniformness of the paper wrinkle cannot be maintained.

The second defect of the ceramic creping blade is that the working edge is prone to appear small irregular notches as shown in FIG. 4 (FIG. 4 is schematic only and the specific dimensions shall be based on the actual conditions), resulting in longitudinal stripes on the paper surface. Generally, ceramic materials are brittle, so it is easy to crack the edge during the manufacture and use. During the creping process of scraping the dryer surface and peeling paper, if the notch is large, linear stripes will be formed at the contact part between the paper surface and the notch, which will affect the paper quality, and lead to the direct failure of the creping blade in a serious case, and shorten the life of the creping blade.

The third defect of the ceramic creping blade is that the hardness of coating material is much higher than that of the dryer surface. When the vibration is serious, it is easy to cause impact, which can easily lead to a damage to the dryer surface.

In view of the shortcomings of the creping blade used at present, it is necessary to provide the creping blade of new forms/materials for the relevant household paper manufacturers, so as to improve the product quality and reduce the production cost.

SUMMARY OF THE INVENTION

In order to solve the above technical problem, an object of the present invention is to provide a creping blade, wherein the self-sharpening property of the creping blade is improved and the probability of the creping blade to damage the dryer is reduced by providing a protective layer, so that the creping blade has a longer service life, and the paper produced thereby has a better quality.

A further objection of the invention is to provide a preparation method of the creping blade.

In order to achieve the above object, the present invention provides a creping blade, comprising a base, wherein a wear-resistant coating is provided on the top of the base, and a protective layer is arranged below the wear-resistant coating at the contact point between the creping blade and a dryer, and the hardness of the protective layer is lower than that of the surface of the dryer of a paper machine.

In the present invention, the working surface of the base refers to the surface on the side of the creping blade close to the dryer of the paper machine during the operation; the top refers to the part of the creping blade in contact with the paper detached from the dryer surface during the operation, and the surface contacting the paper is named the top surface; the contact point refers to the portion of the creping blade in contact with the dryer surface during the operation; the thickness of the base refers to the thickness dimension of the top of the base which is perpendicular to the dryer surface before it is processed; the width of the base refers to the dimension from the bottom of the gripping part of the creping blade to the top of the blade before the angle is processed and the coating is sprayed; the length of the creping blade refers to the dimension along the axial direction of the dryer.

During the operation, one side of the wear-resistant coating at the contact point between the creping blade and the dryer surface will contact the dryer surface to peel the paper from the dryer surface. The peeled paper will contact the front side of the wear-resistant coating, and the wear-resistant coating will exert a certain pressure on the paper surface to form wrinkle structure.

In the moment of the paper being detached from the dryer, it will continuously impact the top of the creping blade near the working edge. The wear-resistant coating can enhance the strength of the paper impact portion during the use, to effectively prevent the damage of the creping blade caused by the above impact and the scratch damage caused by the continuous friction between the paper surface and the top of the creping blade.

In the invention, the dryer can be protected by arranging a protective layer below the wear-resistant coating at the contact point between the creping blade and the dryer. The hardness and wear resistance of this protective layer are lower than those of the dryer. When the working part of the creping blade (i.e. the side of the wear-resistant coating in contact with the surface of the dryer) is passivated or subjected to a large impact force, the edge (protective layer) of the creping blade will collapse, so that the creping blade will be out of contact with the dryer at this position, thus reducing the probability of the creping blade to damage the dryer. The protective layer can be located between the wear-resistant coating and the top surface of the base (as shown in FIG. 5), or it can be arranged along the working surface of the base, or it can be distributed between the wear-resistant coating and the top surface of the base, and meanwhile arranged along the working surface of the base.

According to a specific embodiment of the invention, preferably, when the protective layer is arranged along the working surface of the base, it is located at the position close to the wear-resistant coating on the working surface of the base, as shown in FIG. 6. Moreover, in this case, the side surface of the protective layer close to the top surface of the base should also be covered with the wear-resistant coating. However, the protective layer does not need to cover the whole working surface, as long as there is a suitable width along the working surface, as shown by w' in FIG. 6.

When the protective layer is arranged along the working surface of the base, the arrangement may include the following modes: a first mode: the protective layer protruding from the working surface of the base (as shown in FIG. 6); or, a second mode: the protective layer being located in a notch which is arranged at the top of the base, and the outer surface of the protective layer being in the same plane as the working surface of the base (as shown in FIG. 7 to FIG. 10); or, a third mode: the protective layer comprising two parts, one of which is located in a notch that is arranged at the top of the base, and the other protrudes from the working surface of the base (as shown in FIG. 11, and FIG. 12). In the second mode, the protective layer has a cross section in any suitable shape, such as triangular, rhombic, trapezoid, other regular or irregular shape, as shown in FIG. 7 to FIG. 12.

According to a specific embodiment of the invention, the hardness of the protective layer can be controlled to be equal to or less than $HV_{0.3}$ 300, preferably $HV_{0.3}$ 100-300, more preferably $HV_{0.3}$ 130-250, still more preferably $HV_{0.3}$ 150-220, and the value of 140, 160, 180, 200, 220, 240, 260, 280, or the like can be selected according to different conditions. The protective layer can be made of any material that can meet the above hardness requirements, preferably a soft metal or alloy material. The above metal includes one of copper, aluminum, zinc, tin, nickel, cobalt, magnesium and the like; the above alloy includes an alloy consisting of at least two of copper, aluminum, zinc, tin, nickel, cobalt and magnesium. The protective layer has generally lower wear resistance and strength than the wear-resistant coating.

The creping blade is generally quite long (up to about 4 meters in length), like a long steel strip, and the protective layer is like a strip inlaid at the top of the steel strip. Moreover, in a preferred case, the protective layer can be of the same thickness as the steel strip. According to a specific embodiment of the invention, the thickness of the protective layer can be controlled to 0.1-2.0 mm, preferably 0.3-1.0 mm. Such thickness refers to the dimension from the outer surface of the protective layer to the surface of the base, as shown by h' in FIG. 6 to FIG. 10. When the protective layer has nonuniform thickness in various parts, such thickness refers to the thickness of the part of the protective layer close to the wear-resistant coating, and this part of the protective layer should have an appropriate thickness to ensure that it would not be worn out to the base part during wear, as shown in FIG. 7 and FIG. 10.

According to a specific embodiment of the invention, the wear-resistant coating has a thickness of 0.03-0.25 mm, preferably 0.05-0.12 mm, further preferably 0.03-0.1 mm. In the currently available ceramic creping blade, the wear-resistant coating is thicker. Since the wear-resistant coating has a high hardness, the tip of the edge will be worn over time, generating an arc (or called as round corner). As the arc gets bigger, the paper pattern gets thicker and the quality drops. Since the creping blade of the invention is provided with a protective layer whose hardness is lower than that of the dryer, and only the side of the wear-resistant coating close to the working surface and the side of the protective layer close to the working surface contact the surface of the dryer during use, and the base of the creping blade does not contact the dryer, the contact area between the wear-resistant coating and the dryer remains unchanged, and the contact area between the protective layer and the dryer changes slightly. Because the hardness and wear resistance of the protective layer are far less than those of the dryer, the contact part between the protective layer and the surface of the dryer will be worn synchronously with the wear of the wear-resistant coating, and the contact surface between the working surface and the dryer is not limited. The contact angle between the creping blade and the dryer can be kept constant during working, and there will be no round corner. When the thickness of wear-resistant coating is controlled in a very thin range of 0.03-0.07 mm, the working edge can always be sharp, the paper pattern can be always kept thin, without getting bigger over time of use, and thus a high quality can be maintained. That is, the self-sharpening property of the creping blade can be improved by arranging a protective layer according to the invention.

The material of the wear-resistant coating may be one or more of metal, metal oxide, ceramic material, silicate, carbide, boride and nitride; preferably, the material of the wear-resistant coating comprises one or more of metal, alumina, chromium oxide, zirconia, tungsten carbide, chromium carbide, zirconium carbide, tantalum carbide and titanium carbide. In the invention, the wear-resistant coating can be made of any material meeting the requirements, such as tungsten carbide-cobalt-chromium alloy (86%, 10% and 4% by weight, respectively) or tungsten carbide-chromium carbide-nickel alloy (73%, 20%, and 7% by weight respectively), or a mixture of the two produced in proportion, for which the reference can be made to the existing ceramic creping blade with the wear-resistant coating.

According to a specific embodiment of the invention, when the protective layer is arranged along the working surface of the base, in the second mode, the protective layer has a working buttress and a groove both formed therein (as shown in FIG. 13). By arranging a groove, the width of the contact surface can be reduced and the self-sharpening property can be increased. Herein, the working buttress has a width of 0.15 mm-0.4 mm, and the groove has a depth of 0.2 mm-0.5 mm and a width of 1.5 mm-2.5 mm. The working buttress is arranged between the groove and the top surface of the base. The shape and size of the groove meet the following requirements: during the use of the creping blade, when the working buttress is completely worn out, the connection point between the groove and the working surface at the end far away from the working buttress does not contact the dryer of the paper machine.

According to a specific embodiment of the invention, preferably, the angle between the top surface of the working buttress and the working surface is 0-15°, preferably 8° or less.

According to a specific embodiment of the invention, the groove can be triangular, rhombic, trapezoid or the like, but is not limited thereto.

According to a specific embodiment of the invention, the length, width, and height of the base can be selected specifically as need; preferably, the base has a thickness of 0.6-1.5 mm, a width of 100-150 mm, and the same length as that of the dryer. An appropriate strip steel material can be selected as the base, that is, the above base can be made of steel.

According to the specific embodiment of the invention, preferably, the angle between the top surface and the working surface of the base (that is, the structure angle of the creping blade) is 70°-150°, preferably, 70°-90°.

The invention also provides a preparation method of the above creping blade, which is forming a protective layer on the top surface and/or working surface of the base, and then forming a wear-resistant coating on the top surface of the base, and grinding to obtain the creping blade.

For creping blades with different structures, the preparation methods can be as follows:

In the case of the creping blade having the protective layer located on the top surface of the base: forming a protective layer on the top surface of the base, grinding the top surface of the base to form an appropriate angle (obliquity β is generally between 0° and 20° and can be negative in special cases, which is rare in practice), then forming on the protective layer a wear-resistant coating, and grinding to form a transition angle α (the angle is generally between 0° and 15°, and the width w is generally between 0.5 and 2.5 mm, the specific values are selected according to the equipment conditions; when the creping blade leaves the factory, it may not be ground to form this transition angle, and it can be ground before use in the paper feeding machine; this also applies to the creping blade with the following structure). The preparation process is shown in FIG. 14 to obtain a creping blade.

In the case of the creping blade having the protective layer located on the working surface of the base: forming a protective layer on the working surface of the base, grinding the top surface of the base to form an appropriate angle (obliquity β is generally between 0° and 20° and can be negative in special cases, which is rare in practice), then forming on the top surface of the base a wear-resistant coating, and grinding to form a transition angle α (the angle is generally between 0° and 15°, and the width w is generally between 0.5 and 2.5 mm, the specific values are selected according to the equipment conditions). The preparation process is shown in FIG. 15 to obtain a creping blade.

In the case of the creping blade having the protective layer located on the top surface and the working surface of the base: forming a protective layer on the top surface and the working surface of the base, grinding the top surface of the base to form an appropriate angle (obliquity β is generally between 0° and 20° and can be negative in special cases, which is rare in practice), then forming on the protective layer on the top surface of the base a wear-resistant coating, and grinding to form a transition angle α (the angle is generally between 0° and 15°, and the width w is generally between 0.5 and 2.5 mm, the specific values are selected according to the equipment conditions). The preparation process is shown in FIG. 16 to obtain a creping blade.

In the case of the creping blade having all or part of the protective layer located in the notch at the top of the base: forming a notch at the top of the base, forming a protective layer in the notch, grinding the top surface of the base to form an appropriate angle (obliquity β is generally between 0° and 20° and can be negative in special cases, which is rare in practice), then forming on the top surface of the base a wear-resistant coating, and grinding to form a transition angle α (the angle is generally between 0° and 15°, and the width w is generally between 0.5 and 2.5 mm, the specific values are selected according to the equipment conditions). The preparation process is shown in FIG. 17 to obtain a creping blade.

In preparation, the base can be processed first to have a preliminary shape of the creping blade.

The creping blade according to the invention can use the material of the steel creping blade, which is widely used at present, as the base, so as to facilitate the switch with the steel creping blade widely used at present. The protective layer and the wear-resistant coating can be made by surface engineering technologies such as thermal spraying, electroplating, and laser cladding.

In the creping blade according to the invention, the protective layer has a proper hardness, which can protect the dryer; at the same time, it can keep the working edge of the wear-resistant coating in contact with the surface of the dryer always sharp, thus greatly improving the self-sharpening effect of the creping blade. The wear-resistant coating has high wear resistance, low thermal conductivity, and high bonding strength with the base, which can ensure that the wear-resistant coating and the base will not separate from each other in the subsequent processing and/or use.

The working portion of the wear-resistant coating in the creping blade according to the invention has a constant area and a stable shape. Generally, it is a strip structure with a width of 0.03 mm-0.25 mm, and its contact area with the dryer is very small, so that the wrinkle structure of the prepared paper is substantially unchanged.

The linear pressure of the edge of the creping blade according to the invention is generally 2.5-3 N/mm, which can effectively reduce the friction between the creping blade and the dryer, so as to reduce the resistance during the rotation of the dryer, and achieve the purpose of energy saving.

The creping blade of the invention is advantageous in that the friction portion of working surface has an unlimited area and has a high wear-resistant coating, and the paper impact portion has high wear resistance and high impact resistance, so that the creping blade has a long service life, which can be several times or even tens of times that of the common steel creping blade.

DETAILED DESCRIPTION

The technical solutions of the invention will now be described in detail below in order to have a clearer understanding of the technical features, objects and beneficial effects of the invention, but it should not be construed as limiting the implementable range of the invention.

Example 1

Figure 6:
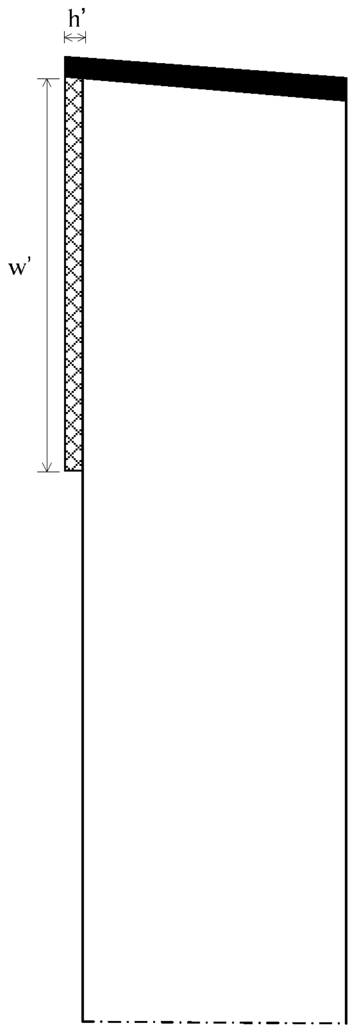
Figure 15:
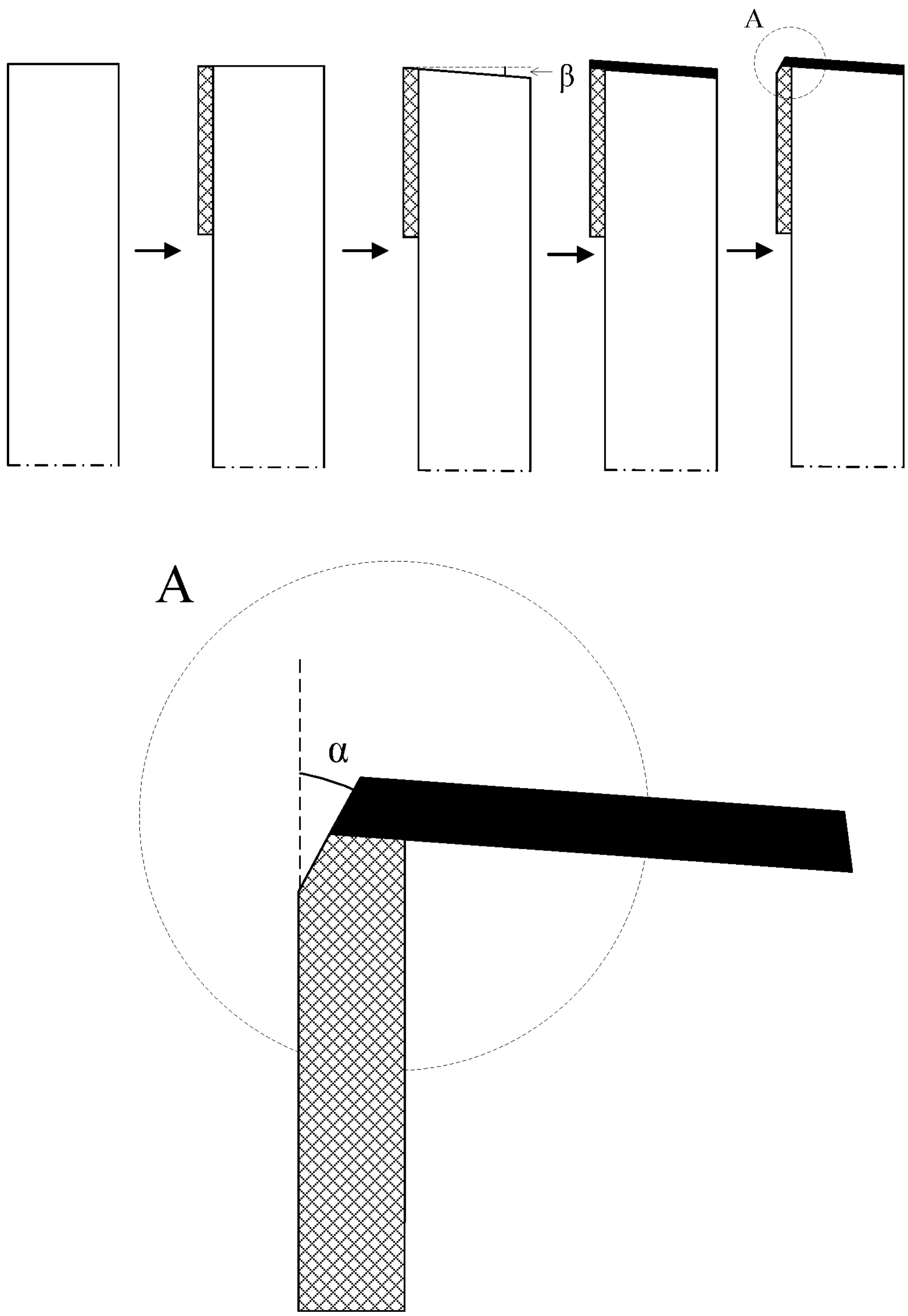
Figure 16:
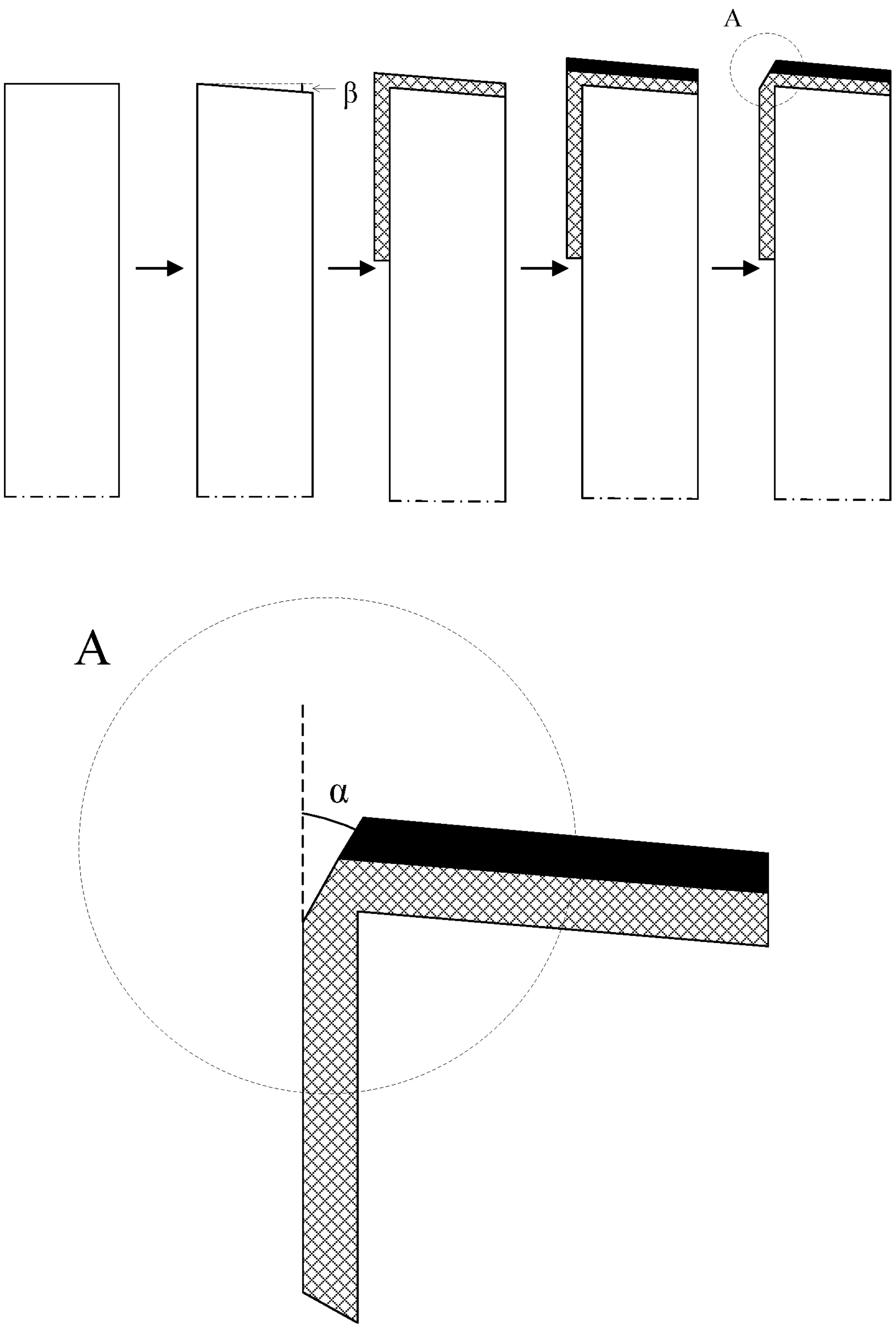

This Example provided a creping blade, as shown in FIG. 6, with a dimension of 4000 mm×120 mm×1.2 mm, which was prepared by the following steps (as shown in FIG. 15):

selecting a steel base of a corresponding specification according to the specification of the creping blade;

spraying a protective layer on the working surface of the base close to the top by high-velocity oxygen-fuel, wherein the protective layer was distributed along the working surface, was made of copper, and had a thickness (h') of 0.5 mm and a width (w) of 4 mm, and the hardness of the protective layer was $HV_{0.3}$ 150;

grinding the top surface of the base to form a transition angle of 5°, wherein the width of the pre-grinding part was 2 mm;

forming a coating on the top surface of the base by high-velocity oxygen-fuel, wherein the material of the coating was tungsten carbon (WC) series alloy powder, and grinding the coating to allow the final wear-resistant coating to have a thickness of 0.03 mm;

processing the contact point between one side of the wear-resistant coating and the surface of the dryer (during use) to form the structural angle of the creping blade, which was 76°, so as to obtain the creping blade.

The creping blade prepared in this Example was practically tested in the following way:

Paper machine for testing: No. 2 paper machine in a toilet paper factory

Test purpose: to compare the life of creping blade and the quality of paper

Figure 1:
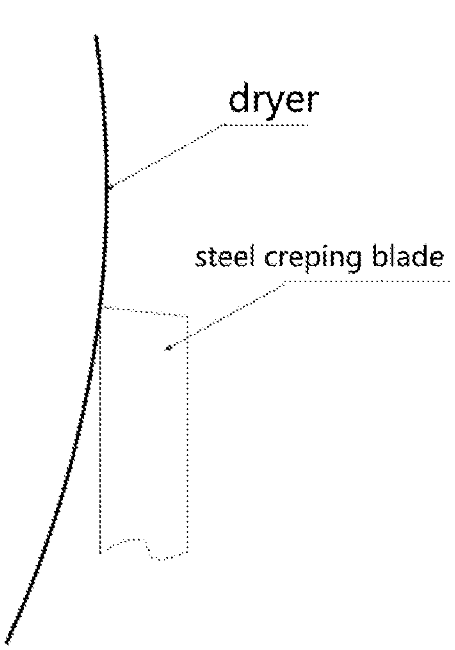
Fig. 1 (Prior Art)
FIG. 1 is a schematic diagram of a steel creping blade.
Figure 2:
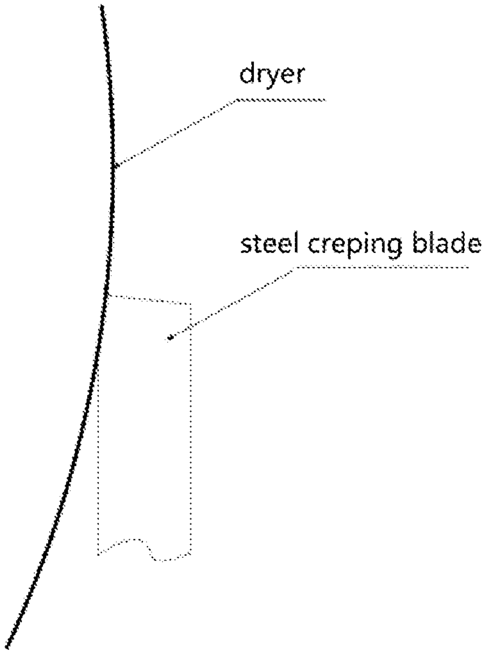
Fig. 2 (Prior Art)
FIG. 2 is a schematic diagram of a steel creping blade in failure state.
Figure 3:
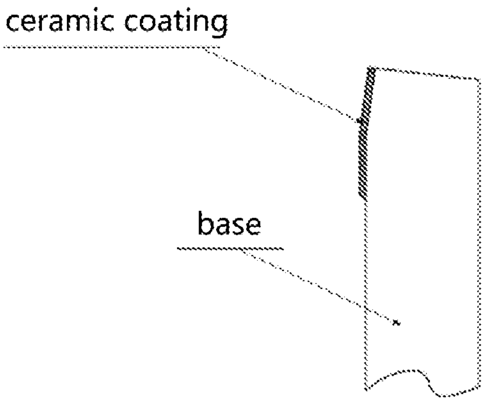
Fig. 3 (Prior Art)
FIG. 3 is a schematic diagram of a ceramic creping blade.
Figure 4:
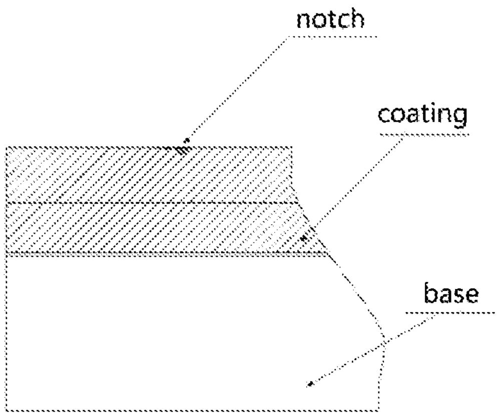
Fig. 4 (Prior Art)
FIG. 4 is a schematic diagram of a ceramic creping blade with notches.

Comparison target: steel creping blade (its schematic diagram in working state was shown in FIG. 1)

The paper machine uses the steel creping blade in production all the year round, and the life span of the creping blade is about 1.5 hours. When the creping blade is replaced, the worn edge of the creping blade is reground, and the creping blade after grinding can be reused. Generally, a new creping blade can be ground 5-6 times, and it will be discarded off when its width is narrowed to nearly 110 mm.

The practical comparison test was carried out by using the creping blade in this Example.

The Specific Process Conditions for the Test were as Follows:

Product: removable facial tissue

Pulp raw materials: a mixed pulp of sugarcane pulp and wood pulp

Paper width: 3550 mm

Paper basis weight: 12.5 $g/m^2$, (without wet strength agent)

Dryer dimension: diameter 2.4 m, length 4.0 m, cast iron dryer with stainless steel coating sprayed on the surface Linear speed of dryer: 600-750 m/min Roll speed: 500-650 m/min Paper moisture content: 5.5%

Inclination of the top of the creping blade: 76°

Load of the creping blade: 4-5 N/mm

Extension length of the creping blade: 25 mm

Adhesive: conventional adhesives, such as the related products produced by Kemecrea (Suzhou) Chemical Co., Ltd.

Analysis of Test Results:

Analysis of paper quality: the quality of paper products produced by using the creping blade in this Example fully met the quality standards required by the manufacturer, and the main indexes were better than those of the steel creping blade. As compared with the case of the steel creping blade, the surface brightness of paper products was improved, the visual effect was excellent, the wrinkles were uniform, and remained substantially unchanged for a long time, particularly suitable for producing fine wrinkle paper. When the change of wrinkles exceeded the standard, the creping blade would not necessarily fail, and it could be used repeatedly when producing the paper with slightly bigger wrinkles until the paper surface appeared stripes or the quality of wrinkles exceeded the standard, where the creping blade failed to work. Paper products had good feel and bulk. The statistical results of the life span of the creping blade were shown in Table 1.

Table 1 Statistical Results of the Life Span of the Creping Blade

| | Fine wrinkle (h) | Continued use in the case of medium wrinkle (h) | Multiple of life span relative to the steel creping blade |
|---|---|---|---|
| Creping blade of the Example | 84 | 45 | 45-56 |
| Steel creping blade | 1.5 | 1 | |

The life span of the creping blade in this Example was slightly different, which was consistent with the designed hardness and wear resistance.

In addition to improving the quality of paper products, the creping blade in this Example had an extremely long service life, which greatly reduced the labor intensity of workers and decreased the output loss caused by tool replacement. Within the life span of one creping blade in this Example, the machine can produce 2.5 tons more products, while reducing the waste of paper caused by tool replacement.

Example 2

This Example provided a creping blade, as shown in FIG. 6, with a dimension of 4300 mm×120 mm×1.2 mm, which was prepared by the following steps (as shown in FIG. 15):

selecting a steel base of a corresponding specification according to the specification of the creping blade;

spraying a protective layer on the working surface of the base close to the top by high-velocity oxygen-fuel, wherein the protective layer was distributed along the working surface, was made of metal nickel, and had a thickness (h') of 0.5 mm and a width (w) of 4 mm, and the hardness of the protective layer was $HV_{0.3}$ 150;

grinding the top surface of the base to form a transition angle of 5°, wherein the width of the pre-grinding part was 2 mm;

forming a coating on the top surface of the base by high-velocity oxygen-fuel, wherein the material of the coating was tungsten carbon (WC) series alloy powder, and grinding the coating to allow the final wear-resistant coating to have a thickness of 0.05 mm;

processing the contact point between one side of the wear-resistant coating and the surface of the dryer (during use) to form the structural angle of the creping blade, which was 80°, so as to obtain the creping blade.

The creping blade prepared in this Example was practically tested in the following way:

Paper machine for testing: No. 4 paper machine in a toilet paper factory

Test purpose: to compare the life of creping blade and the quality of paper

Comparison target: steel creping blade

The paper machine uses the steel creping blade in production all the year round, and the life span of the creping blade is about 0.8 hour. When the creping blade is replaced, the worn edge of the creping blade is reground, and the creping blade after grinding can be reused. Generally, a new creping blade can be ground 5-6 times, and it will be discarded off when its width is narrowed to nearly 90 mm.

The practical comparison test was carried out by using the creping blade in this Example.

The Specific Process Conditions for the Test were as Follows:

Product: removable facial tissue

Pulp raw materials: wood pulp board

Paper width: 4100 mm

Paper basis weight: 14.5 g/m$^2$, (without wet strength agent)

Dryer dimension: diameter 3.5 m, length 4300 mm, steel dryer with stainless steel coating sprayed on the surface Linear speed of dryer: 830 m/min Roll speed: 590 m/min Paper moisture content: 25%

Inclination of the top of the creping blade: 80°

Load of the creping blade: 30 N/mm

Extension length of the creping blade: 15 mm

Adhesive: conventional adhesives, such as the related products produced by Shanghai Petrofer Special Lubricants Co., Ltd.

Analysis of Test Results:

Analysis of paper quality: the quality of paper products produced by using the creping blade in this Example fully met the quality standards required by the manufacturer, and the main indexes were better than those of the steel creping blade. As compared with the case of the steel creping blade, the surface brightness of paper products was improved, the visual effect was excellent, the wrinkles were uniform, and remained substantially unchanged for a long time, particularly suitable for producing fine wrinkle paper. When the change of wrinkles exceeded the standard, the creping blade would not necessarily fail, and it could be used repeatedly when producing the paper with slightly bigger wrinkles until the paper surface appeared stripes or the quality of wrinkles exceeded the standard, where the creping blade failed to work. Paper products had good feel and bulk. The statistical results of the life span of the creping blade were shown in Table 2.

Table 2 Statistical Results of the Life Span of the Creping Blade

| | Fine wrinkle (h) | Multiple of life span relative to the steel creping blade |
|---|---|---|
| Creping blade of the Example | 85 | 106 |
| Steel creping blade | 0.8 | |

The life span of the creping blade in this Example was slightly different, which was consistent with the designed hardness and wear resistance.

In addition to improving the quality of paper products, the creping blade in this Example had an extremely long service life, which greatly reduced the labor intensity of workers and decreased the output loss caused by tool replacement. Within the life span of one creping blade in this Example, the machine can produce more products, while reducing the waste of paper caused by tool replacement.

Example 3

Figure 5:
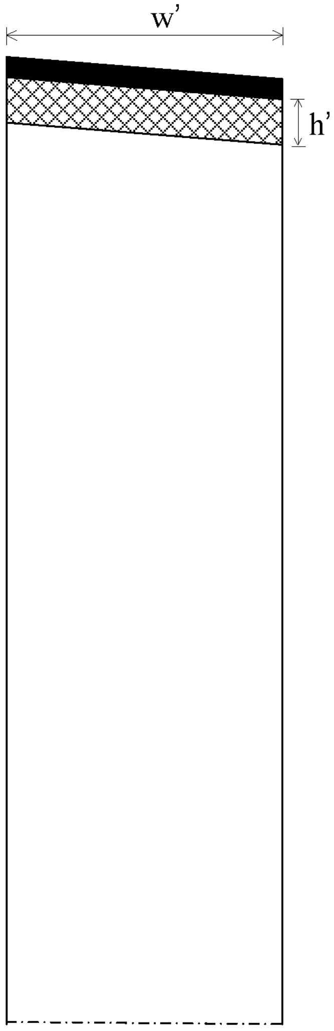
FIG. 5 to FIG. 13 are schematic diagrams of creping blades having different forms of protective layer, respectively.
Figure 14:
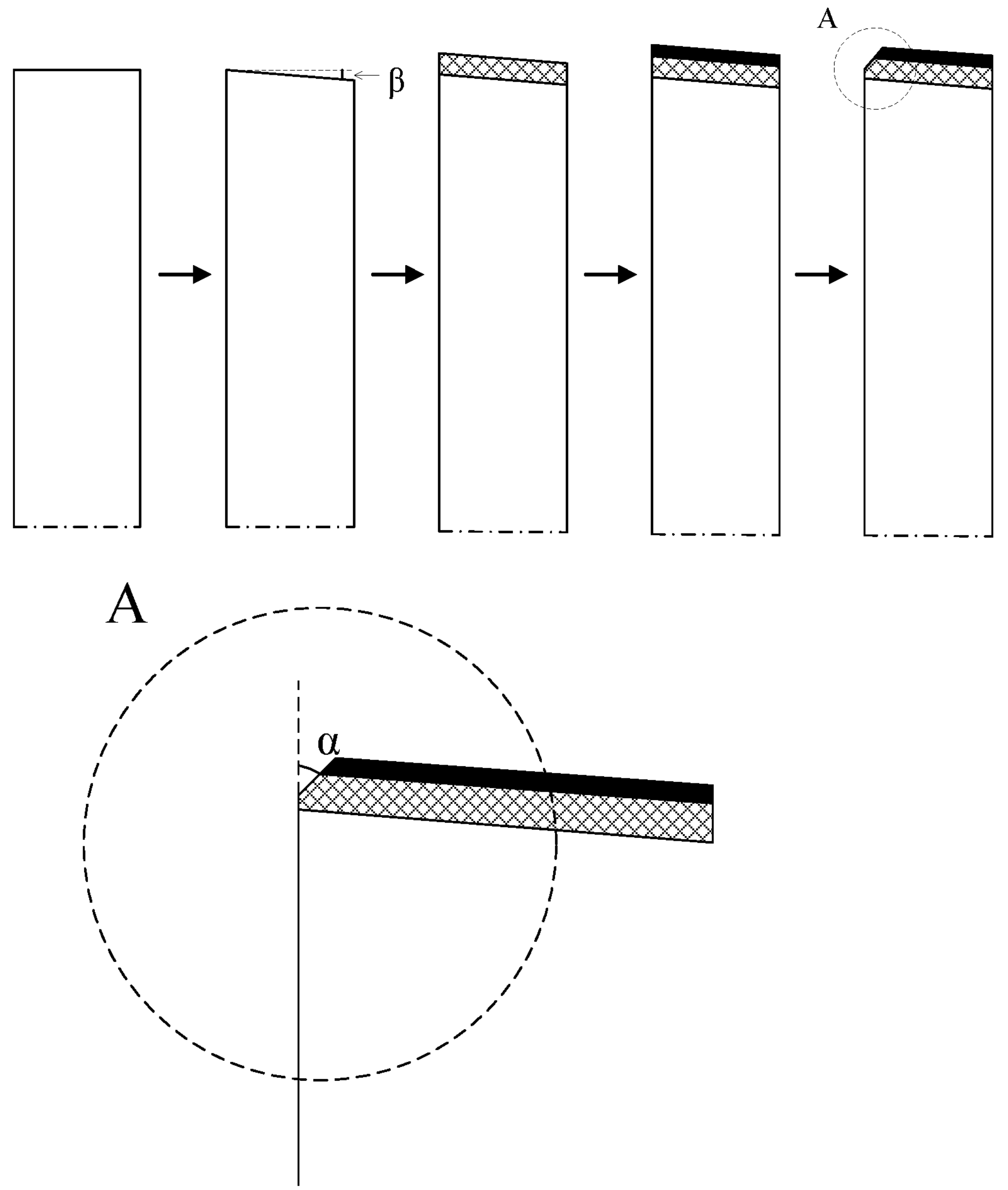
FIG. 14 to FIG. 17 are schematic diagrams showing the preparation process of different creping blades, respectively.

This Example provided a creping blade, as shown in FIG. 5, with a dimension of 4000 mm×120 mm×1.2 mm, which was prepared by the following steps (as shown in FIG. 14):

selecting a steel base of a corresponding specification according to the specification of the creping blade;

grinding the top surface of the base to form a transition angle of 7°, wherein the width of the pre-grinding part was 2.0 mm;

forming a protective layer on the top surface of the base by laser cladding, wherein the protective layer was distributed along the working surface, was made of metal magnesium, and had a thickness (h') of 0.7 mm, and the hardness of the protective layer was $HV_{0.3}$ 200;

forming a coating on the surface of the protective layer by high-velocity oxygen-fuel, wherein the material of the coating was chromium carbide, and grinding the coating to allow the final wear-resistant coating to have a thickness of 0.05 mm;

processing the contact point between one side of the wear-resistant coating and the surface of the dryer (during use) to form the structural angle of the creping blade, which was 80°, so as to obtain the creping blade.

The creping blade prepared in this Example was practically tested in the following way:

Paper machine for testing: No. 2 paper machine in a toilet paper factory

Test purpose: to compare the life of creping blade and the quality of paper

Comparison target: steel creping blade

The paper machine uses the steel creping blade in production all the year round, and the life span of the creping blade is about 1-2 hours. When the creping blade is replaced, the worn edge of the creping blade is reground, and the creping blade after grinding can be reused. Generally, a new creping blade can be ground 6-7 times, and it will be discarded off when its width is narrowed to nearly 110 mm.

The practical comparison test was carried out by using the creping blade in this Example.

The specific process conditions for the test were as follows:

Product: roll tissue

Pulp raw materials: a mixed pulp of bamboo pulp and wood pulp

Paper width: 4000 mm

Paper basis weight: 13.5 g/m$^2$, (without wet strength agent)

Dryer dimension: diameter 2.3 m, length 4.5 m, cast iron dryer with stainless steel coating sprayed on the surface Linear speed of dryer: 700-950 m/min Roll speed: 600-850 m/min Paper moisture content: 6.5%

Inclination of the top of the creping blade: 80°

Load of the creping blade: 4-5 N/mm

Extension length of the creping blade: 20 mm

Adhesive: conventional adhesives, such as the related products produced by Ashland (Changzhou) Chemical Co., Ltd.

Analysis of Test Results:

Analysis of paper quality: the quality of paper products produced by using the creping blade in this Example fully met the quality standards required by the manufacturer, and the main indexes were better than those of the steel creping blade. As compared with the case of the steel creping blade, the surface brightness of paper products was improved, the visual effect was excellent, the wrinkles were uniform, and remained substantially unchanged for a long time, particularly suitable for producing fine wrinkle paper. When the change of wrinkles exceeded the standard, the creping blade would not necessarily fail, and it could be used repeatedly when producing the paper with slightly bigger wrinkles until the paper surface appeared stripes or the quality of wrinkles exceeded the standard, where the creping blade failed to work. Paper products had good feel and bulk. The statistical results of the life span of the creping blade were shown in Table 3.

Table 3 Statistical Results of the Life of the Creping Blade

| | Fine wrinkle (h) | Continued use in the case of medium wrinkle (h) | Multiple of life span relative to the steel creping blade |
|---|---|---|---|
| Creping blade of the Example | 76 | 46 | 46-63 |
| Steel creping blade | 1.2 | 1 | |

The life span of the creping blade in this Example was slightly different, which was consistent with the designed hardness and wear resistance.

In addition to improving the quality of paper products, the creping blade in this Example had an extremely long service life, which greatly reduced the labor intensity of workers and decreased the output loss caused by tool replacement. Within the life span of one creping blade in this Example, the machine can produce 2.3 tons more products, while reducing the waste of paper caused by tool replacement.

Example 4

This Example provided a creping blade, as shown in FIG. 5, with a dimension of 3150 mm×120 mm×1.2 mm, which was prepared by the following steps (as shown in FIG. 14):

selecting a steel base of a corresponding specification according to the specification of the creping blade;

grinding the top surface of the base to form a transition angle of 5°, wherein the width of the pre-grinding part was 2.0 mm;

forming a protective layer on the top surface of the base by high-velocity oxygen-fuel, wherein the protective layer was distributed along the working surface, was made of metal copper, and had a thickness (h') of 0.6 mm, and the hardness of the protective layer was $HV_{0.3}$ 150;

forming a coating on the surface of the protective layer by high-velocity oxygen-fuel, wherein the material of the coating was chromium carbide, and grinding the coating to allow the final wear-resistant coating to have a thickness of 0.08 mm;

processing the contact point between one side of the wear-resistant coating and the surface of the dryer (during use) to form the structural angle of the creping blade, which was 83°, so as to obtain the creping blade.

The creping blade prepared in this Example was practically tested in the following way:

Paper machine for testing: No. 2 paper machine in a toilet paper factory

Test purpose: to compare the life of creping blade and the quality of paper

Comparison target: cermet creping blade

The paper machine uses the cermet creping blade in production all the year round, and the life span of the creping blade is about 30 hours.

The practical comparison test was carried out by using the creping blade in this Example.

The Specific Process Conditions for the Test were as Follows:

Product: roll tissue

Pulp raw materials: a mixed pulp of bamboo pulp and wood pulp

Paper width: 3000 mm

Paper basis weight: 13.5 g/m$^2$, (without wet strength agent)

Dryer dimension: diameter 3400 mm, length 3200 mm, cast iron dryer with stainless steel coating sprayed on the surface Linear speed of dryer: 900 m/min Roll speed: 600 m/min Paper moisture content: 22%

Inclination of the top of the creping blade: 83°

Load of the creping blade: 27 N/mm

Extension length of the creping blade: 15 mm

Adhesive: conventional adhesives, such as the related products produced by Shanghai Petrofer Special Lubricants Co., Ltd.

Analysis of Test Results:

Analysis of paper quality: the quality of paper products produced by using the creping blade in this Example fully met the quality standards required by the manufacturer, and the main indexes were better than those of the cermet creping blade. As compared with the case of the cermet creping blade, the surface brightness of paper products was improved, the visual effect was excellent, the wrinkles were uniform, and remained substantially unchanged for a long time, particularly suitable for producing fine wrinkle paper. When the change of wrinkles exceeded the standard, the creping blade would not necessarily fail, and it could be used repeatedly when producing the paper with slightly bigger wrinkles until the paper surface appeared stripes or the quality of wrinkles exceeded the standard, where the creping blade failed to work. Paper products had good feel and bulk. The statistical results of the life span of the creping blade were shown in Table 4.

Table 4 Statistical Results of the Life of the Creping Blade

| | Fine wrinkle (h) | Continued use in the case of medium wrinkle (h) | Multiple of life span relative to the steel creping blade |
|---|---|---|---|
| Creping blade of the Example | 78 | | 2.9 |
| Cermet creping blade | 9 | 18 | 1 |

The life span of the creping blade in this Example was slightly different, which was consistent with the designed hardness and wear resistance.

In addition to improving the quality of paper products, the creping blade in this Example had an extremely long service life, which greatly reduced the labor intensity of workers and decreased the output loss caused by tool replacement. Within the life span of one creping blade in this Example, the machine can produce more products, while reducing the waste of paper caused by tool replacement.

Example 5

Figure 7:
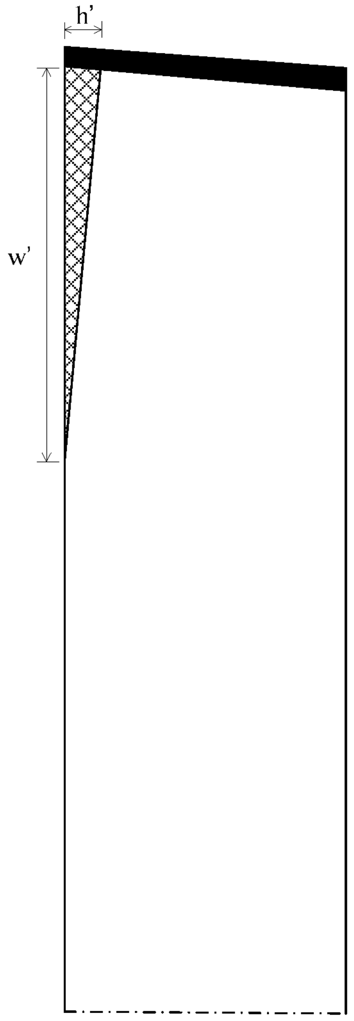
Figure 8:
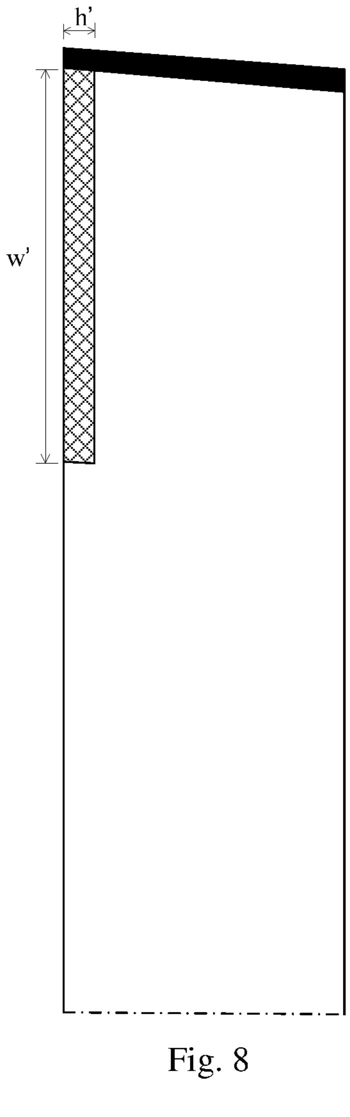
Figure 9:
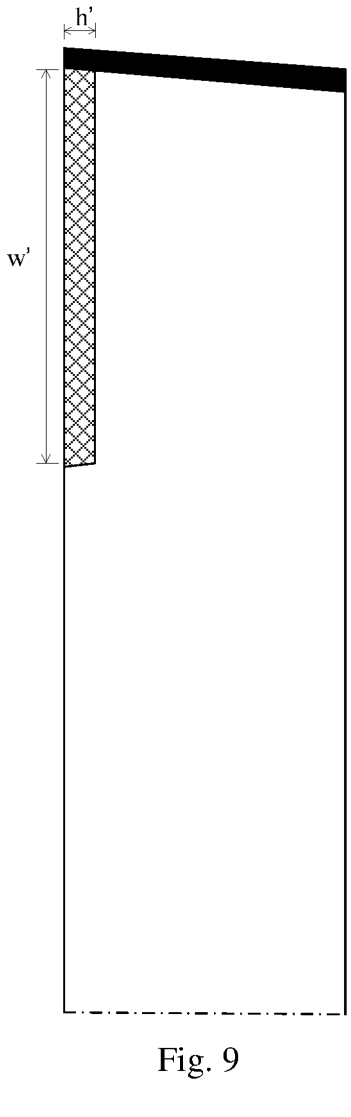
Figure 10:
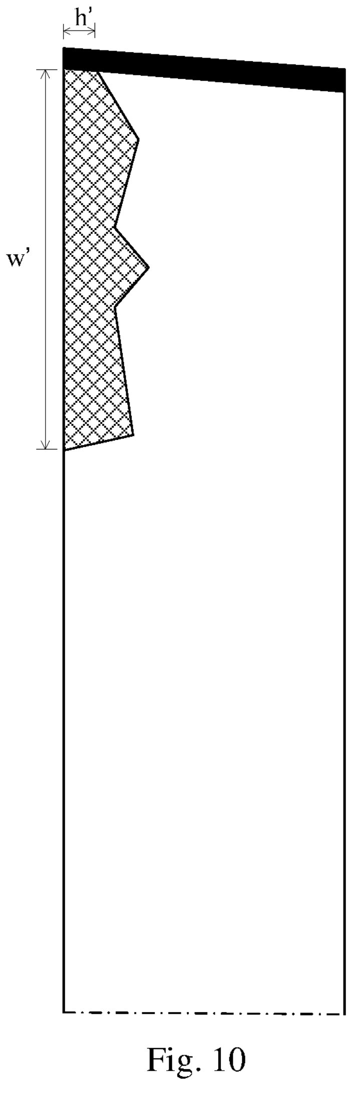
Figure 11:
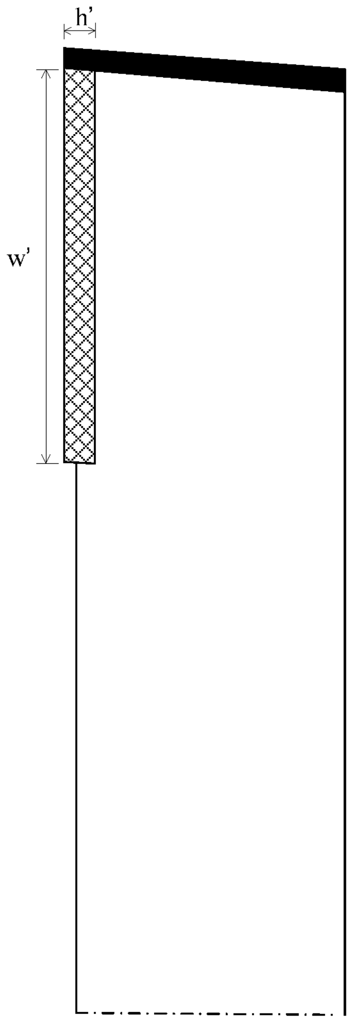
Figure 12:
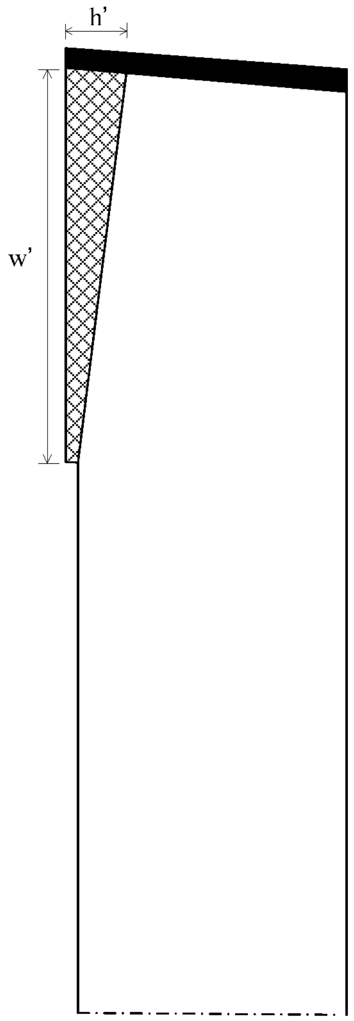
Figure 13:
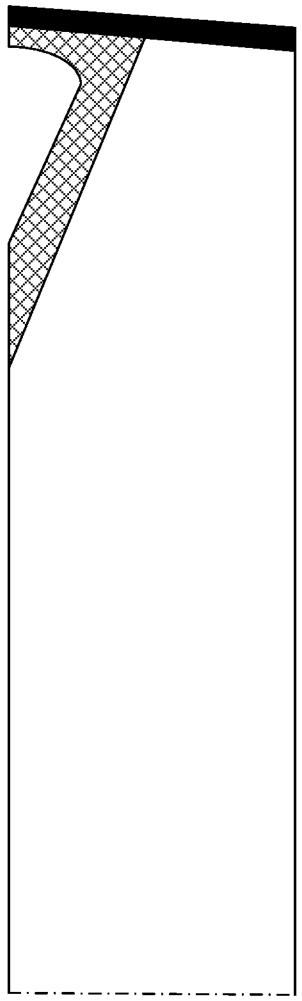
Figure 17:
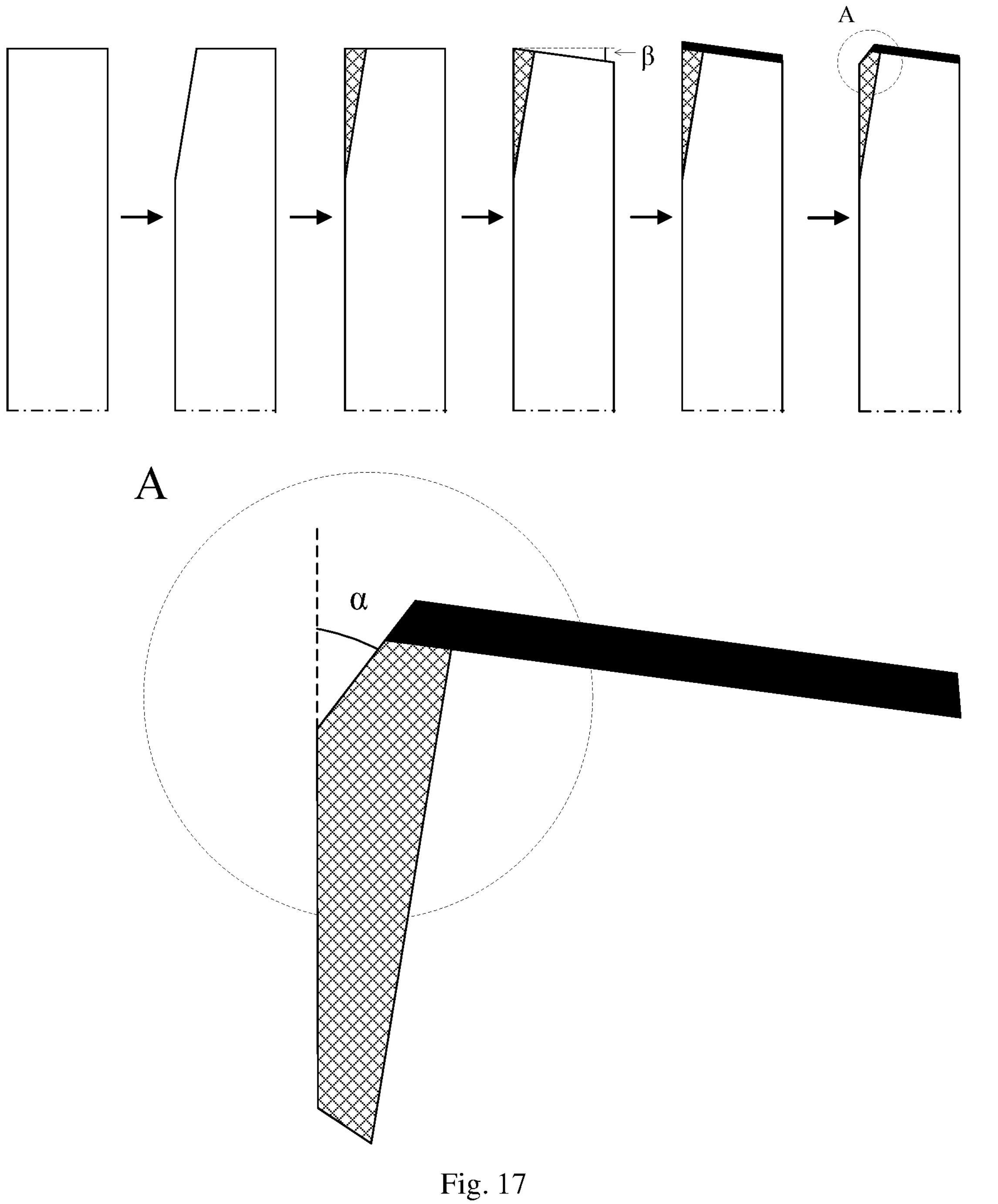

This Example provided a creping blade, as shown in FIG. 7, with a dimension of 3150 mm×120 mm×1.2 mm, which was prepared by the following steps (as shown in FIG. 17):

selecting a steel base of a corresponding specification according to the specification of the creping blade;

forming a right triangle notch at the top of the base, wherein the two sides had lengths of 1.0 mm and 15 mm respectively, the short side was located on the top surface and the long side was on the working surface;

forming a protective layer in the notch, wherein the long side of the protective layer was aligned with the working surface of the base, and the short side was aligned with the top surface of the base, the protective layer was made of metal nickel, and the hardness of the protective layer was $HV_{0.3}$ 230;

grinding the top surface of the base to form a transition angle of 5°, wherein the width of the pre-grinding part was 1.8 mm;

forming a wear-resistant coating on the top surface of the base by high-velocity oxygen-fuel, wherein the material of the coating was tungsten carbide, and grinding the wear-resistant coating to allow the final wear-resistant coating to have a thickness of 0.06 mm;

processing the contact point between one side of the wear-resistant coating and the surface of the dryer (during use) to form the structural angle of the creping blade, which was 85°, so as to obtain the creping blade.

The creping blade prepared in this Example was practically tested in the following way:

Paper machine for testing: No. 1 paper machine in a toilet paper factory

Test purpose: to compare the life of creping blade and the quality of paper

Comparison target: cermet creping blade

The paper machine uses the cermet creping blade in production all the year round, and the life span of the creping blade is about 25 hours.

The practical comparison test was carried out by using the creping blade in this Example.

The Specific Process Conditions for the Test were as Follows:

Product: removable facial tissue

Pulp raw materials: bamboo pulp

Paper width: 3000 mm

Paper basis weight: 13.5 g/m$^2$, (without wet strength agent)

Dryer dimension: diameter 3400 mm, length 3200 mm, cast iron dryer with stainless steel coating sprayed on the surface Linear speed of dryer: 850 m/min Roll speed: 580 m/min Paper moisture content: 20%

Inclination of the top of the creping blade: 85°

Load of the creping blade: 34 N/mm

Extension length of the creping blade: 15 mm

Adhesive: conventional adhesives, such as the related products produced by Shanghai Petrofer Special Lubricants Co., Ltd.

Analysis of Test Results:

Analysis of paper quality: the quality of paper products produced by using the creping blade in this Example fully met the quality standards required by the manufacturer, and the main indexes were better than those of the cermet creping blade. As compared with the case of the cermet creping blade, the surface brightness of paper products was improved, the visual effect was excellent, the wrinkles were uniform, and remained substantially unchanged for a long time, particularly suitable for producing fine wrinkle paper. When the change of wrinkles exceeded the standard, the creping blade would not necessarily fail, and it could be used repeatedly when producing the paper with slightly bigger wrinkles until the paper surface appeared stripes or the quality of wrinkles exceeded the standard, where the creping blade failed to work. Paper products had good feel and bulk. The statistical results of the life span of the creping blade were shown in Table 5.

Table 5 Statistical Results of the Life of the Creping Blade

| | Fine wrinkle (h) | Continued use in the case of medium wrinkle (h) | Multiple of life span relative to the steel creping blade |
|---|---|---|---|
| Creping blade of the Example | 73 | | 3.5 |
| Cermet creping blade | 7 | 14 | |

The life span of the creping blade in this Example was slightly different, which was consistent with the designed hardness and wear resistance.

In addition to improving the quality of paper products, the creping blade in this Example had an extremely long service life, which greatly reduced the labor intensity of workers and decreased the output loss caused by tool replacement. Within the life span of one creping blade in this Example, the machine can produce more products, while reducing the waste of paper caused by tool replacement.

Example 6

This Example provided a creping blade, as shown in FIG. 7, with a dimension of 4000 mm×120 mm×1.2 mm, which was prepared by the following steps (as shown in FIG. 17):

selecting a steel base of a corresponding specification according to the specification of the creping blade;

forming a right triangle notch at the top of the base, wherein the two sides had lengths of 1.0 mm and 15 mm respectively, the short side was located on the top surface and the long side was on the working surface;

forming a protective layer in the notch, wherein the long side of the protective layer was aligned with the working surface of the base, and the short side was aligned with the top surface of the base, the protective layer was made of metal copper, and the hardness of the protective layer was $HV_{0.3}$ 140;

grinding the top surface of the base to form a transition angle of 5°, wherein the width of the pre-grinding part was 1.8 mm;

forming a wear-resistant coating on the top surface of the base by high-velocity oxygen-fuel, wherein the material of the coating was tungsten carbide, and grinding the wear-resistant coating to allow the final wear-resistant coating to have a thickness of 0.06 mm;

processing the contact point between one side of the wear-resistant coating and the surface of the dryer (during use) to form the structural angle of the creping blade, which was 76°, so as to obtain the creping blade.

The creping blade prepared in this Example was practically tested in the following way:

Paper machine for testing: No. 2 paper machine in a toilet paper factory

Test purpose: to compare the life of creping blade and the quality of paper

Comparison target: steel creping blade

The paper machine uses the steel creping blade in production all the year round, and the life span of the creping blade is about 1.5 hours. When the creping blade is replaced, the worn edge of the creping blade is reground, and the creping blade after grinding can be reused. Generally, a new creping blade can be ground 6-7 times, and it will be discarded off when its width is narrowed to nearly 110 mm The practical comparison test was carried out by using the creping blade in this Example.

The specific process conditions for the test were as follows:

Product: removable facial tissue

Pulp raw materials: pure wood pulp

Paper width: 3600 mm

Paper basis weight: 13.5 g/$m^2$, (without wet strength agent)

Dryer dimension: diameter 2.5 m, length 4.0 m, cast iron dryer with stainless steel coating sprayed on the surface Linear speed of dryer: 750-900 m/min Roll speed: 600-800 m/min Paper moisture content: 7.5%

Inclination of the top of the creping blade: 76°

Load of the creping blade: 4-5 N/mm

Extension length of the creping blade: 18 mm

Adhesive: conventional adhesives, such as the related products produced by Shanghai Petrofer Special Lubricants Co., Ltd.

Analysis of Test Results:

Analysis of paper quality: the quality of paper products produced by using the creping blade in this Example fully met the quality standards required by the manufacturer, and the main indexes were better than those of the steel creping blade. As compared with the case of the steel creping blade, the surface brightness of paper products was improved, the visual effect was excellent, the wrinkles were uniform, and remained substantially unchanged for a long time, particularly suitable for producing fine wrinkle paper. When the change of wrinkles exceeded the standard, the creping blade would not necessarily fail, and it could be used repeatedly when producing the paper with slightly bigger wrinkles until the paper surface appeared stripes or the quality of wrinkles exceeded the standard, where the creping blade failed to work. Paper products had good feel and bulk. The statistical results of the life span of the creping blade were shown in Table 6.

Table 6 Statistical Results of the Life of the Creping Blade

| | Fine wrinkle (h) | Continued use in the case of medium wrinkle (h) | Multiple of life span relative to the steel creping blade |
|---|---|---|---|
| Creping blade of the Example | 106 | 56 | 56-70 |
| Steel creping blade | 1.5 | 1 | |

The life span of the creping blade in this Example was slightly different, which was consistent with the designed hardness and wear resistance.

In addition to improving the quality of paper products, the creping blade in this Example had an extremely long service life, which greatly reduced the labor intensity of workers and decreased the output loss caused by tool replacement. Within the life span of one creping blade in this Example, the machine can produce 2.5 tons more products, while reducing the waste of paper caused by tool replacement.

It can be seen from Examples 1-6 that the creping blade of the invention can allow the produced paper to have a substantially unchanged wrinkle structure, and has a long service life.

What is claimed is:

1. A creping blade, comprising a base, wherein a wear-resistant coating is provided on a top of the base, and a protective layer is arranged below the wear-resistant coating at a contact point between the creping blade and a dryer, the protective layer is located between the wear-resistant coating and a top surface of the base, and a hardness of the protective layer is lower than that of a surface of the dryer of a paper machine;

wherein a wear resistance of this protective layer is lower than that of the dryer.

2. The creping blade according to claim 1, wherein the protective layer is arranged along a working surface of the base.

3. The creping blade according to claim 2, wherein when the protective layer is arranged along the working surface of the base, the protective layer is located at a position close to the wear-resistant coating on the working surface of the base.

4. The creping blade according to claim 2, wherein the modes for providing the protective layer include:

a first mode: the protective layer protruding from the working surface of the base; or a second mode: the protective layer being located in a notch which is arranged at the top of the base, and an outer surface of the protective layer being in the same plane as the working surface of the base; or a third mode: the protective layer comprising two parts, one of which is located in a notch that is arranged at the top of the base, and the other protrudes from the working surface of the base.

5. The creping blade according to claim 4, wherein in the second and third modes, the protective layer has a cross section in the form of triangular, rhombic, or trapezoid.

6. The creping blade according to claim 5, wherein in the second mode, the protective layer has a working buttress and a groove formed therein.

7. The creping blade according to claim 6, wherein the working buttress has a width of 0.15 mm-0.4 mm, the groove has a depth of 0.2 mm-0.5 mm and a width of 1.5 mm-2.5 mm, and the working buttress is provided between the groove and the top surface of the base;

the groove is triangular, rectangular or trapezoidal.

8. The creping blade according to claim 1, wherein the wear resistance and hardness of the protective layer are lower than those of the wear-resistant coating.

9. The creping blade according to claim 1, wherein the protective layer has a hardness of equal to or less than $HV_{0.3}$ 300.

10. The creping blade according to claim 9, wherein the protective layer has a hardness of $HV_{0.3}$ 100-300.

11. The creping blade according to claim 10, wherein the protective layer has a hardness of $HV_{0.3}$ 130-250.

12. The creping blade according to claim 11, wherein the protective layer has a hardness of $HV_{0.3}$ 150-220.

13. The creping blade according to claim 1, wherein the material of the protective layer is metal or alloy.

14. The creping blade according to claim 13, wherein the metal selects from copper, aluminum, zinc, tin, nickel, cobalt and magnesium; and the alloy is consisting of at least two of copper, aluminum, zinc, tin, nickel, cobalt and magnesium.

15. The creping blade according to claim 1, wherein the protective layer has a thickness of 0.1-2.0 mm.

16. The creping blade according to claim 15, wherein the protective layer has a thickness of 0.3-1.0 mm.

17. The creping blade according to claim 1, wherein the wear-resistant coating has a thickness of 0.03-0.25 mm.

18. The creping blade according to claim 1, wherein the material of the wear-resistant coating selects from one or more of metal, alumina, chromium oxide, zirconia, tungsten carbide, chromium carbide, zirconium carbide, tantalum carbide and titanium carbide.

19. The creping blade according to claim 18, wherein, the material of the wear-resistant coating is tungsten carbide-cobalt-chromium alloy or tungsten carbide-chromium carbide-nickel alloy.

20. The creping blade according to claim 1, wherein the base has a thickness of 0.6-1.5 mm, and a width of 100-150 mm;

a angle between the top surface and the working surface of the base is 70°-150°.

* * * * *